(12) United States Patent  (10) Patent No.: US 8,825,711 B2
Chan et al.  (45) Date of Patent: Sep. 2, 2014

(54) MANAGING CROSS-CORRELATED DATA (75) Inventors: Robyn J. Chan, San Francisco, CA (US); Magdi Morsi, San Jose, CA (US)

(73) Assignee: Magnet Systems, Inc., Palo Alto, CA (US)

( * ) Notice: Subject to any disclaimer, the term of this patent is extended or adjusted under 35 U.S.C. 154(b) by 2 days.

(21) Appl. No.: 13/584,732

(22) Filed: Aug. 13, 2012

(65) Prior Publication Data
US 2014/0046982 A1    Feb. 13, 2014

(51) Int. Cl.
*G06F 7/00* (2006.01)
*G06F 17/30* (2006.01)
*G06Q 50/00* (2012.01)

(52) U.S. Cl.
CPC .......... *G06F 17/30958* (2013.01); *G06Q 50/01* (2013.01); *G06F 17/30* (2013.01)
USPC ........................................................ 707/798

(58) Field of Classification Search
None
See application file for complete search history.

(56) References Cited

U.S. PATENT DOCUMENTS

| | | | |
|---|---|---|---|
| 8,086,598 B1 | 12/2011 | Lamb et al. | |
| 8,185,558 B1 | 5/2012 | Narayanan et al. | |
| 2008/0243770 A1 | 10/2008 | Aasman | |
| 2009/0024590 A1 | 1/2009 | Sturge et al. | |
| 2011/0119245 A1 | 5/2011 | Sargeant et al. | |
| 2011/0137932 A1* | 6/2011 | Wable | 707/769 |
| 2012/0005224 A1 | 1/2012 | Ahrens et al. | |
| 2012/0179958 A1* | 7/2012 | Tarjan | 715/234 |
| 2012/0215785 A1* | 8/2012 | Singh et al. | 707/741 |
| 2012/0310929 A1* | 12/2012 | Patterson et al. | 707/728 |
| 2012/0317097 A1* | 12/2012 | Tseng | 707/722 |
| 2013/0073983 A1* | 3/2013 | Rasmussen et al. | 715/753 |
| 2013/0132138 A1* | 5/2013 | Doganata et al. | 705/7.11 |
| 2013/0262212 A1* | 10/2013 | Shevelenko et al. | 705/14.27 |
| 2013/0268591 A1* | 10/2013 | Chen et al. | 709/204 |
| 2013/0282806 A1* | 10/2013 | Steinberg et al. | 709/204 |

FOREIGN PATENT DOCUMENTS

WO    2014/028300 A1    2/2014

OTHER PUBLICATIONS

International Search Report and Written Opinion for PCT Application No. PCT/US2013/054140 mailed Jan. 29, 2014.

* cited by examiner

*Primary Examiner* — Jay Morrison
(74) *Attorney, Agent, or Firm* — Kilpatrick Townsend & Stockton LLP (57) ABSTRACT

Systems and processes for storing correlated data in a graph database are described. A first user node may be stored. In response to a request, a first event node and a second user node may be stored. The first event node may be associated with the first user node through an edge indicating participation. The first event node may be associated with the second user node through an edge indicating participation. In response to a content access, a second event node and a content node may be stored. The second event node may be associated with the first user node through an edge indicating participation. The second event node may be associated with the content node through an edge indicating usage. The first user node may be associated with the content node through an edge indicating the first user node handles the content node.

27 Claims, 8 Drawing Sheets

MANAGING CROSS-CORRELATED DATA

BACKGROUND

1. Field

The present disclosure relates to managing data, and more specifically to managing data using relationships and associations among the data.

2. Related Art

Traditional approaches for managing data use relational database systems. Relational databases often store data using related tables and use primary keys and foreign keys to capture associations. Primary keys used in relational databases typically uniquely identify a data table. Foreign keys, which are associated with the data table, typically match the primary key of another data table in the relational database. The foreign keys allow associated data tables to be cross-referenced.

SUMMARY

Systems and processes for storing correlated data in a graph database are described. A first user node associated with a first user may be stored in the graph database. The first user node may be associated with a profile and an identifier. In response to detecting a first request from the first user to create a profile for a second user, a first event node and a second user node may be stored. The first event node may be associated with the first user node through an edge indicating the first user is a participant of the first event. The first event node may be associated with the second user node through an edge indicating the second user node is a participant of the first event node.

In response to detecting an access of a content by the first user, a second event node and a first content node may be stored, the first content node associated with the content. The second event node may be associated with the first user node through an edge indicating the first user node is a participant of the second event node. The second event node may be associated with the first content node through an edge indicating the second event node uses the first content node. The first user node may be associated with the first content node through an edge indicating the first user node handles the first content node.

In response to detecting a change in the information about the first user, a third event node and a third user node may be stored. The third user node may be associated with the first identifier. The third event node may be associated with the third user node through a seventh edge, the seventh edge indicating the third user node is a participant of the third event node. The third user node may be associated with the first user node through an eighth edge, the eighth edge relating the third user node and the first user node.

In response to detecting a change in the content caused by a fourth user, a fourth event node and a second content node may be stored. The fourth event node may be associated with a fourth user node through a ninth edge, the ninth edge indicating the fourth user node is a participant of the fourth event node. The fourth event node may be associated with the second content node through a tenth edge, the tenth edge indicating the fourth event node uses the second content node. The second content node may be associated with the first content node through an eleventh edge, the eleventh edge indicating the second content node references the first content node.

Further in response to detecting an access of the content by the first user, a second content node associated with a workspace may be stored. The first content node may be associated with the second content node through a seventh edge indicating the second content contains the first content. The sixth edge may further indicate the association between the first user node and the first content node as owner, reviewer, or modifier. Detecting the access of the content by the first user may comprise detecting an upload of the content by the first user.

The first event node may be associated with a first time information, the first time information based on the time of the first request. The second event node may be associated with a second time information, the second time information based on the time of the access of the content. The third event node may be associated with a third time information, the third time information based on the time the change in the information about the first user was detected. The fourth event node may be associated with a fourth time information, the fourth time information based on the time the change in the content was detected.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Various embodiments are described below relating to systems and processes for storing correlated data in a graph database are described. A first user node associated with a first user may be stored in the graph database. The first user node may be associated with a profile and an identifier. In response to detecting a first request from the first user to create a profile for a second user, a first event node and a second user node may be stored. The first event node may be associated with the first user node through an edge indicating the first user is a participant of the first event. The first event node may be associated with the second user node through an edge indicating the second user node is a participant of the first event node. In response to detecting an access of a content by the first user, a second event node and a first content node may be stored. The first content node may be associated with the content. The second event node may be associated with the first user node through an edge indicating the first user node is a participant of the second event node. The second event node may be associated with the first content node through an edge indicating the second event node uses the first content node. The first user node may be associated with the first content node through an edge indicating the first user node handles the first content node.

An activity graph may include a graph database, which primarily uses three constructs to represent and store data: nodes, properties, and edges. The activity graph may be used to represent users, contents, actions, their associated relationships, and their properties. As the users, contents, actions, their associated relationships, and their properties change over time, the activity graph may be updated to represent the changes. This may allow the changes to be captured without losing the history of the previous states of the activity graph. Such an activity graph enables efficiently storing, associating, and retrieving correlated data.

Figure 1:
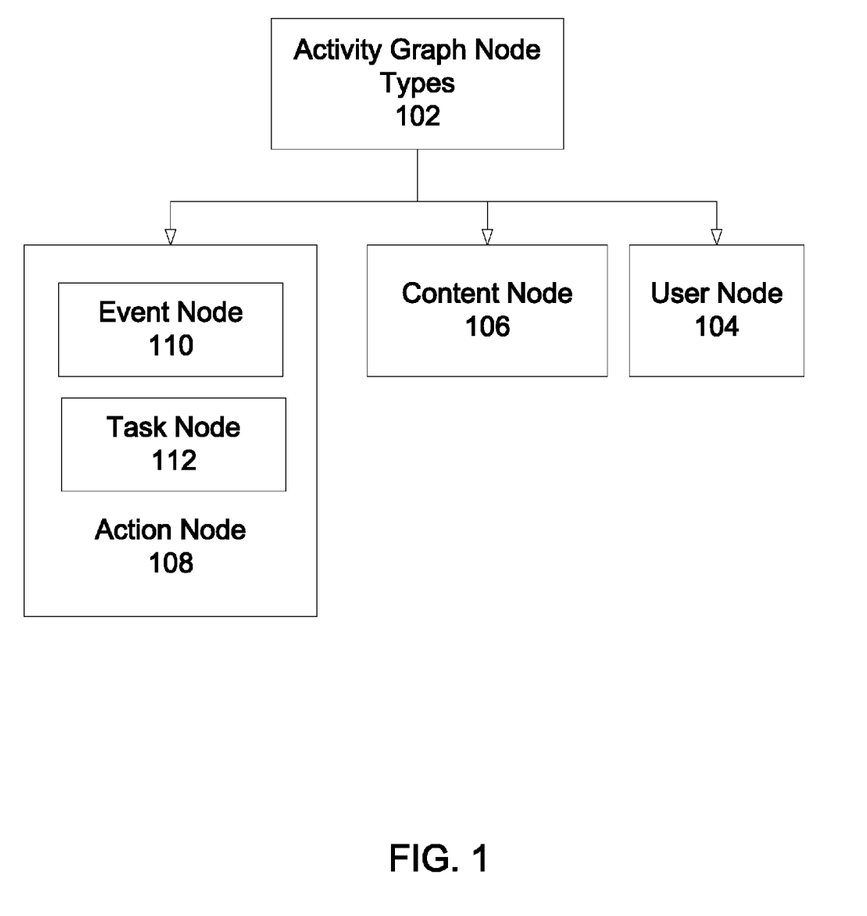
FIG. 1 illustrates the inheritance hierarchy of node types in an activity graph.

FIG. 1 illustrates the inheritance hierarchy of node types 102 in an activity graph. For example, nodes may represent users, contents, and actions. A user node 104 is a generalized representation of an individual or other entity. The individual may be, for example, a user of a computing system. A content node 106 is a generalized representation of a resource. The content node 106 may represent, for example, a document, a folder capable of storing documents, an electronic media file, a goal, media content, an inventory item, and the like. An action node 108 is a generalized representation of an event or a task, represented by an event node 110 and a task node 112, respectively. For example, an event may include a specific deed or action performed by an individual, a computing system, or any other entity. An event may also include an occurrence, which may be associated with a particular time or duration. For example, a task may include a deed or action to be performed by an individual, a computing system, or any other entity. More specifically, a task may be a specific piece of work that may be assigned to an individual, a computing system, or any other entity for performance. In one example, events may be system-generated while tasks are user defined operations that include an associated state or status.

The nodes in the activity graph may include properties. These properties may include attributes of the nodes, such as a node type, an entity identifier, and a timestamp. The node type may be a text representation of the type of the node. For example, the node type may be "user," indicating the node is a user node, "content," indicating the node is a content node, or "action," indicating the node is an action node. Additionally, or alternatively, to having a node type of "action," the node may be a node type of "event," indicating the node is an event node, or "task," indicating the node is a task node. One of ordinary skill in the art will readily appreciate that the association between a node and its node type may be achieved using alternative text, alternative values, or other typing schemes.

The entity identifier of a node may identify the actual entity that is referenced by the node. For example, each entity referenced by one or more nodes may be assigned a unique identifier. The nodes which reference the entity may contain the unique identifier of the entity in order to reflect their association with the entity. In another example, the entity identifier need not be unique. Examples of entity identifiers include alphanumerical identifiers selected by a computer system, social security numbers of individuals, employee numbers of individuals, serial numbers of devices, and the like. Thus, multiple nodes associated with a person may contain the entity identifier associated with that person.

The timestamp of a node may be used to identify a date or time of occurrence. For example, the timestamp of a user node may indicate when the user was added to the computer system, or when information associated with the user was updated in the computer system. In another example, the timestamp of a content node may indicate when the content was created, modified, added to the computer system, or modified in the computer system. In yet another example, a timestamp of an action node may indicate when an activity occurred or when the occurrence of the activity was added to the computer system. These timestamps may allow the system to determine the state of the activity graph at a specific point in time. The timestamps may also be used for time-constrained queries, discussed below.

FIGS. 2A-2F illustrate exemplary relationships between various types of nodes. The relationships between nodes of the activity graph may be represented using edges. An edge connects two or more nodes together. Edges in the activity graph include more information than a mere pointer. An edge may be unidirectional or bidirectional. A bidirectional edge may also be referred to as an undirected edge because the edge does not represent an implicit direction. A unidirectional edge may also be referred to as a directed edge because the edge infers a one-way connection from one node to another node. Unidirectional edges are illustrated as an arrow, showing the direction of the edge from one node to another. Thus, an edge shows an association between two nodes, the relationship between the nodes, and the direction of the relationship.

The edges in the activity graph may include additional properties. These properties may include attributes of the edge, such as an edge type, an edge sub-type, a relationship identifier, and a timestamp. The edge type may be a text representation of the type of the edge. Exemplary edge types are discussed in detail, below. Additionally, or alternatively, to an edge type, an edge may have an edge sub-type. An edge sub-type provides additional specificity about the type of edge. One of ordinary skill in the art will readily appreciate that the association between an edge and its edge type or sub-type may be achieved using alternative text, alternative values, or other typing schemes.

The relationship identifier of an edge may identify the actual relationship that is referenced by the edge. For example, the relationship between two or more entities referenced by nodes may be assigned a unique identifier. The edges that reference the relationship may contain the unique identifier of the relationship in order to reflect the association with the relationship. In another example, the relationship identifier need not be unique. Examples of entity identifiers include alphanumerical identifiers selected by a computer system, named working relationships between individuals, and the like. Thus, multiple edges associated with the relationship may contain the relationship identifier associated with that relationship.

The timestamp of an edge may be used to identify a date or time of occurrence for the relationship. For example, the timestamp of an edge may indicate when an action adding a user was associated with the creation of the user as a node. In another example, the timestamp of an edge may indicate when an updated document was associated with an earlier version of the document. In another example, the timestamp of an edge may indicate when the two nodes connected by the edge were associated. These timestamps may allow the system to determine the state of the activity graph at a specific point in time. The timestamps may also be used for time-constrained queries, discussed below.

Figure 2A:
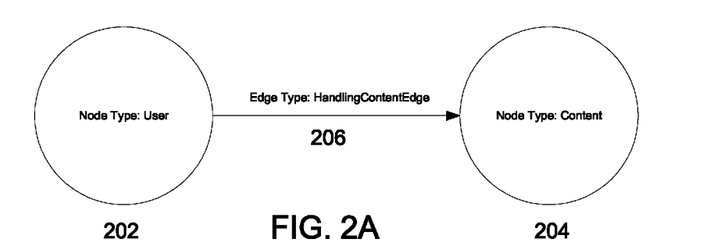
FIG. 2 illustrates relationships between various node types.

FIG. 2A illustrates a relationship between a user node 202 and a content node 204. The relationship is represented by the handling content edge 206, named "HandlingContentEdge." The handling content edge 206 may be a unidirectional edge that indicates that the entity associated with user node 202 handles the content associated with content node 204. This may be represented using an arrow pointing from the user node 202 to the content node 204. For example, a user who creates or uploads a document to the system may be represented as handling the document. Similarly, a user who updates, deletes, views, or otherwise accesses a document may be represented as handling the document. Capturing this relationship in the activity graph may be helpful for determining which users of the system have handled a particular document, revision of a particular document, or other content.

Figure 2B:
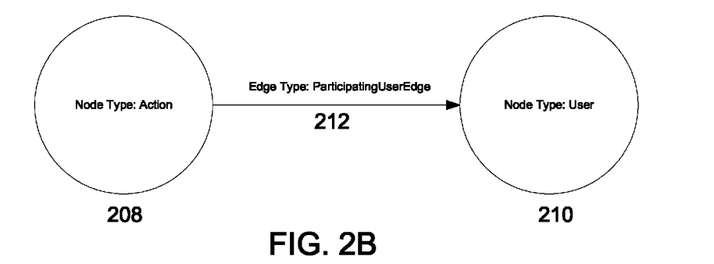

FIG. 2B illustrates a relationship between an action node 208 and a user node 210. The relationship is represented by the participating user edge 212, named "ParticipatingUserEdge." The participating user edge 212 may be a unidirectional edge that indicates that the entity associated with user node 210 is a participant of the activity associated with action node 208. This may be represented using an arrow pointing from action node 208 to user node 210. For example, a user who creates or uploads a document to the system may be represented as participating in the creation or upload action. Similarly, a user who creates, uploads, updates, deletes, views, or otherwise accesses a content may be represented as a participant of the activity performed on the content.

Figure 2C:
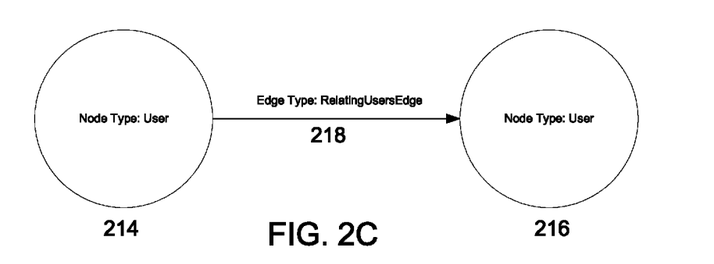

FIG. 2C illustrates a relationship between a first user node 214 and a second user node 216. The relationship is represented by the relating users edge 218, named "RelatingUsersEdge." The relating users edge 218 may be a unidirectional edge that indicates that the entity associated with the first user node 214 relates to the entity associated with the second user node 216. This may be represented using an arrow pointing from the first user node 214 to the second user node 216. The unidirectional nature of this edge allows a determination of the direction of the relationship. For example, if one user recommends, vouches for, adds, verifies, references, or otherwise performs an action relating to the other user, the unidirectional edge may represents, and thus may be used to determine, which user performed the action. Where a bidirectional edge is used, it may be unclear which user is on which side of the relationship.

Figure 2D:
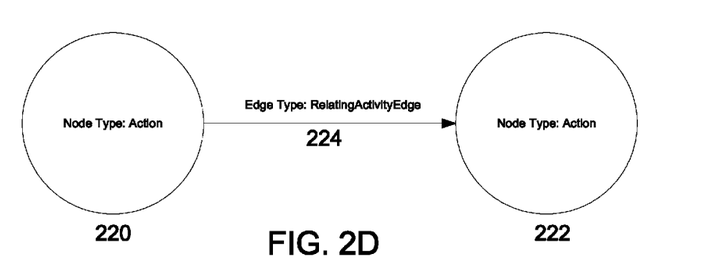

FIG. 2D illustrates a relationship between a first action node 220 and a second action node 222. The relationship is represented by the relating activity edge 224, named "RelatingActivityEdge." The relating activity edge 224 may be a unidirectional edge that indicates that the activity associated with the first action node 220 relates to the activity associated with the second action node 222. This may be represented using an arrow pointing from the first action node to the second action node. This type of relationship may be used, for example, to indicate and determine an order of activities or whether an activity is a part (or subset) of another activity.

Figure 2E:
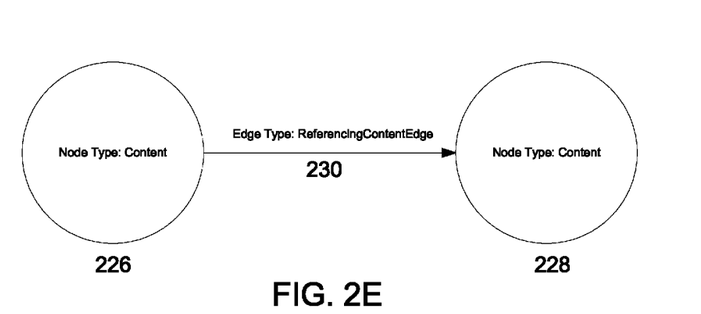

FIG. 2E illustrates a relationship between a first content node 226 and a second content node 228. The relationship is represented by the referencing content edge 230, named "ReferencingContentEdge." The referencing content edge 230 may be a unidirectional edge that indicates that the content associated with the first content node 226 references the content associated with the second content node 228. This may be represented using an arrow pointing from the first content node to the second content node. For example, a spreadsheet document may be associated with a particular workspace, and thus may reference the workspace. In this scenario, a referencing content edge 230 may point from the content node associated with the spreadsheet document to the content node associated with the workspace. The referencing content edge 230 may also include additional properties to further clarify the relationship between the two content nodes.

Figure 2F:
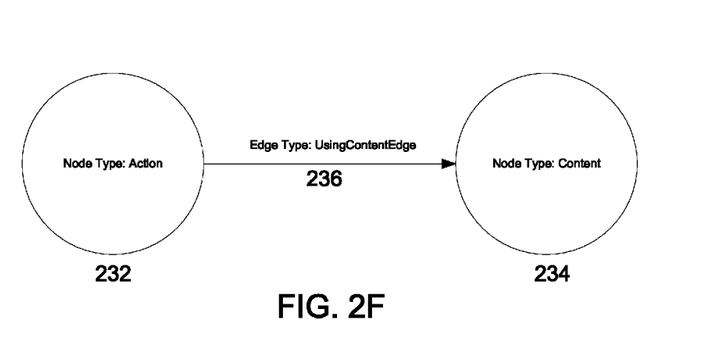

FIG. 2F illustrates a relationship between an action node 232 and a content node 234. The relationship is represented by the using content edge 236, named "UsingContentEdge." The using content edge 236 may be a unidirectional edge that indicates that the activity associated with the action node 232 uses the content associated with the content node 234. This may be represented using an arrow pointing from the action node 232 to the content node 234. For example, the action of creating a document or uploading a document to the system may be associated with the document created or uploaded through the using content edge. Similarly, an action that updates, deletes, or otherwise accesses a resource or content may be represented as using the resource or content through the using content edge. Capturing this relationship in the activity graph may be helpful for determining which actions have used a particular document, revision of a particular document, or other content or resource. The using content edge 236 may also include an attribute that indicates the type of usage, named UsageType. For example, an edge between a task to review a price sheet and the node representing the price sheet to be reviewed may include a UsageType of "pricing guidelines."

Figure 3:
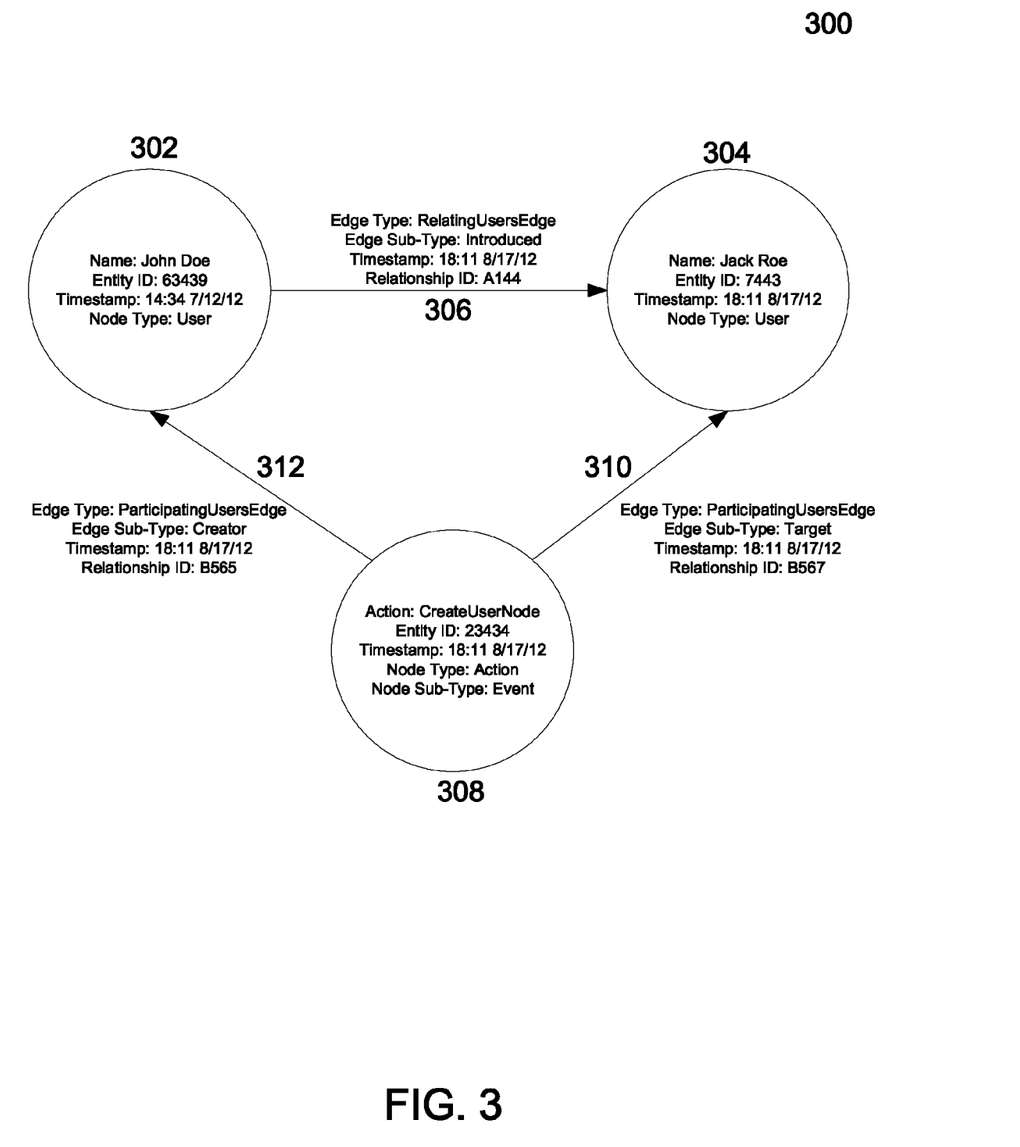
FIG. 3 illustrates an exemplary activity graph representing the addition of a new user.

FIG. 3 illustrates an exemplary activity graph 300 representing the addition of a new user. Node 302 is a user node of an existing user with the name John Doe. For node 302, the node type is "User," the entity identifier is "63439," and the timestamp is "14:34 7/12/12," as illustrated in FIG. 3. For example, the entity identifier may be the employee number of John Doe. The timestamp may indicate when John Doe's computer user account or employee identification account was created. John Doe may log into an computer system to create a new account for an individual by the name of "Jack Roe." In response to John performing the creation of the new account, nodes 304 and 308 and edges 306, 310, and 312 are added to the activity graph 300.

Node 304 is a user node for the new user with the name of Jack Row. For node 304, the node type is "User," the entity identifier is "7443," and the timestamp is "18:11 8/17/12," as illustrated in FIG. 3. For example, the entity identifier may be the employee number of Jack Row. This employee number may have been entered by John Doe when he created the account, or may have been assigned by the computer system at the time Jack Roe's account was created. The timestamp may indicate when Jack Roe's computer user account or employee identification account was created.

Edge 306 is a unidirectional edge with an edge type of "RelatingUsersEdge," and edge sub-type of "Introduced." The edge may indicate that John Doe and Jack Roe are related users and that John Doe introduced Jack Roe into the computer system. The timestamp for edge 306 is "18:11 8/17/12," and may indicate that the relationship was formed at this day and time. The relationship ID for edge 306 is "A144" and may represent an actual relationship. A "friends" or "friend of" relationship is an example of a relationship between two users. Other relationships include "reports to" or "peer of" relationships, which may indicate the type of relationship between individuals in an enterprise setting. One of ordinary skill in the art will readily appreciate that other types of relationships may also be indicated. This information may be useful to determine, for example, all of the users that John Doe has introduced into the system. More specifically, this information may be useful to determine all of the users that John Doe has introduced into the system between a specified time duration.

Node 308 is an action node for the event of creating the user Jack Roe. For node 308, the node type is "Action," the node sub-type is "Event," the node action is "CreateUserNode," the entity identifier is "23434," and the timestamp is "18:11 8/17/12," as illustrated in FIG. 3. Thus, node 308 represents the event of creating the user Jack Roe.

Edge 310 is a unidirectional edge with an edge type of "ParticipatingUsersEdge" and a role indicator of "Target." The edge may indicate that Jack Roe was a participant in the event represented by node 308. More specifically, edge 310 may indicate that node 304 was the target of the event represented by node 308. The timestamp for edge 310 is "18:11 8/17/12," and may indicate that the creation of node 304 occurred at this day and time. The relationship ID for edge 310 is "B567" and may represent an actual relationship between the event of node 308 and the user of node 304.

A role indicator may represent the role of a user in a task. The role may be represented as a ParticipatingUsersEdge between the task node and the user node associated with the task node. For example, a task of "reviewing a document" may include a requestor role and a reviewer role. The requestor role may be represented as part of the ParticipatingUsersEdge between the "reviewing a document" task node and the user node associated with the requestor. Similarly, the reviewer role may be represented as part of the ParticipatingUsersEdge between the "reviewing a document" task node and the user node associated with the reviewer.

Edge 312 is a unidirectional edge with an edge type of "ParticipatingUsersEdge," and role indicator of "Creator." The edge may indicate that John Doe was a participant in the event represented by node 308. More specifically, edge 312 may indicate that node 302 was the creator of the event represented by node 308, and thus created the user account associated with node 304. The timestamp for edge 312 is "18:11 8/17/12," and may indicate that the association between the two nodes was formed at this day and time. The relationship ID for edge 312 is "B565" and may represent an actual relationship between the event of node 308 and the user of node 302.

Figure 4:
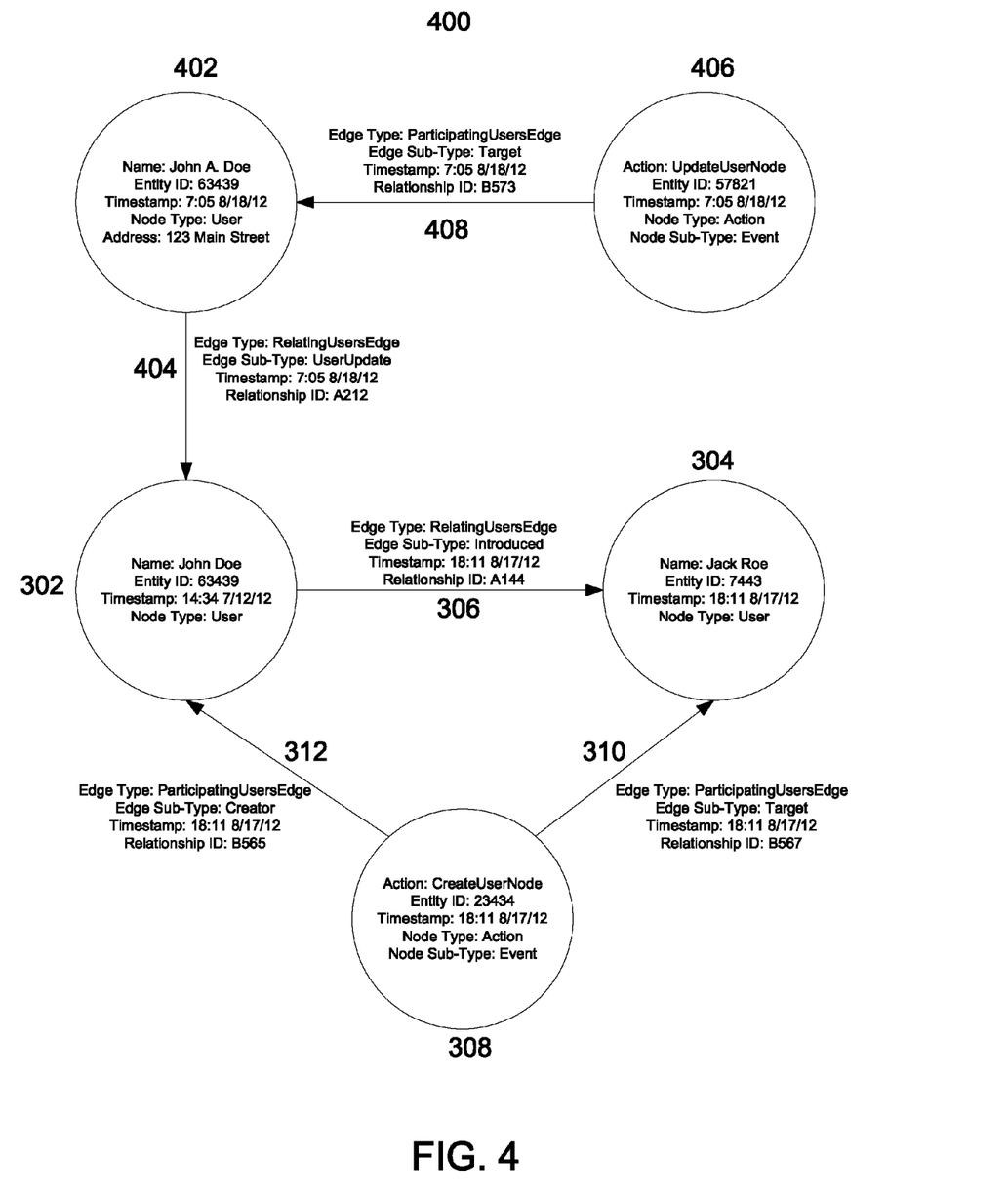
FIG. 4 illustrates an exemplary activity graph representing the modification of an existing user.

FIG. 4 illustrates an exemplary activity graph representing the modification of an existing user. Node 302 is a user node of an existing user with the name John Doe, as discussed above with regard to FIG. 3. The system receives an update on the profile information of the John Doe, who has an entity identifier of "63439," as illustrated in node 302 of FIG. 4. A new node 402 is added to the activity graph representing the modification of profile information of the user associated with node 302.

Node 402 is a user node. For node 402, the node type is "User," the entity identifier is "63439," and the timestamp is "7:05 8/18/12," as illustrated in FIG. 4. Note that the entity identifier of node 402 and 302 is the same. This indicates that these two user nodes both relate to the same underlying individual. Node 402 includes updated profile information about the individual with entity identifier 63439. First, the user's name has been updated to include a middle initial, "A." Second, an address of "123 Main Street" has been associated with the user. The timestamp of "7:05 8/18/12" associated with node 402 may indicate the day and time when the modification to the user's profile information was entered or the day and time when the modification to the user's profile information goes into effect.

Edge 404 is a unidirectional edge with an edge type of "RelatingUsersEdge," and a versioned profile information indication of "UserUpdate." Edge 404 may indicate that node 402 relates to node 302. More specifically, edge 404 may indicate that node 402 is an update to the profile information of the user represented by node 302. The timestamp for edge 404 is "7:05 8/18/12," and may indicate that the relationship between node 302 and 402 was created at this day and time.

Node 406 is an action node for the event of updating the profile information for the user John Doe. For node 406, the node type is "Action," the node sub-type is "Event," the node action is "UpdateUserNode," the entity identifier is "57821," and the timestamp is "7:05 8/18/12," as illustrated in FIG. 4. Thus, node 406 represents the event of updating the user profile information associated with the user John Doe.

Edge 408 is a unidirectional edge with an edge type of "ParticipatingUsersEdge," and edge sub-type of "Target." The edge may indicate that John A. Doe was a participant in the event represented by node 406. More specifically, edge 408 may indicate that node 402 is the target for the event represented by node 406. The timestamp for edge 408 is "7:05 8/18/12," and may indicate that the association between the two nodes was formed at this day and time or that the update request was received at this day and time. The relationship ID for edge 408 is "B573" and may represent an actual relationship between the event of node 406 and the user of node 402.

The activity graph 400 may be traversed to determine the relationships between the users and activities. For example, based on the timestamps of the nodes and edges, it may be determined that the user associated with entity identifier 63439 was known as "John Doe" and did not have an associated address at the time the user created the "John Doe" account. Further, it can be determined that the same user associated with entity identifier 63439 is now known as "John A. Doe" and is associated with an address of "123 Main Street."

In a relational database model, the association between users, contents, and actions may require the use of a join operator. This may incur a large overhead as a result of the many-to-many relationship among users, contents, and actions. Normalization of such a database may also require an additional table, which also adds to the overhead. In contrast, an activity graph using an object database or a graph database may not need to be normalized. The relationships may be stored in association with the objects, nodes, and edges of the object database or graph database. Further, object databases and graph databases may allow query or navigation of the database using a proprietary API design. In a relational database, the queries define the retrieved users, contents, actions, and their relationships. Further, an activity graph using an object database or a graph database enables storing information without a database schema. This may be particularly advantageous when the attributes associated with a node or an edge are not fully defined as part of the declaration of the node type or edge type.

Figure 5:
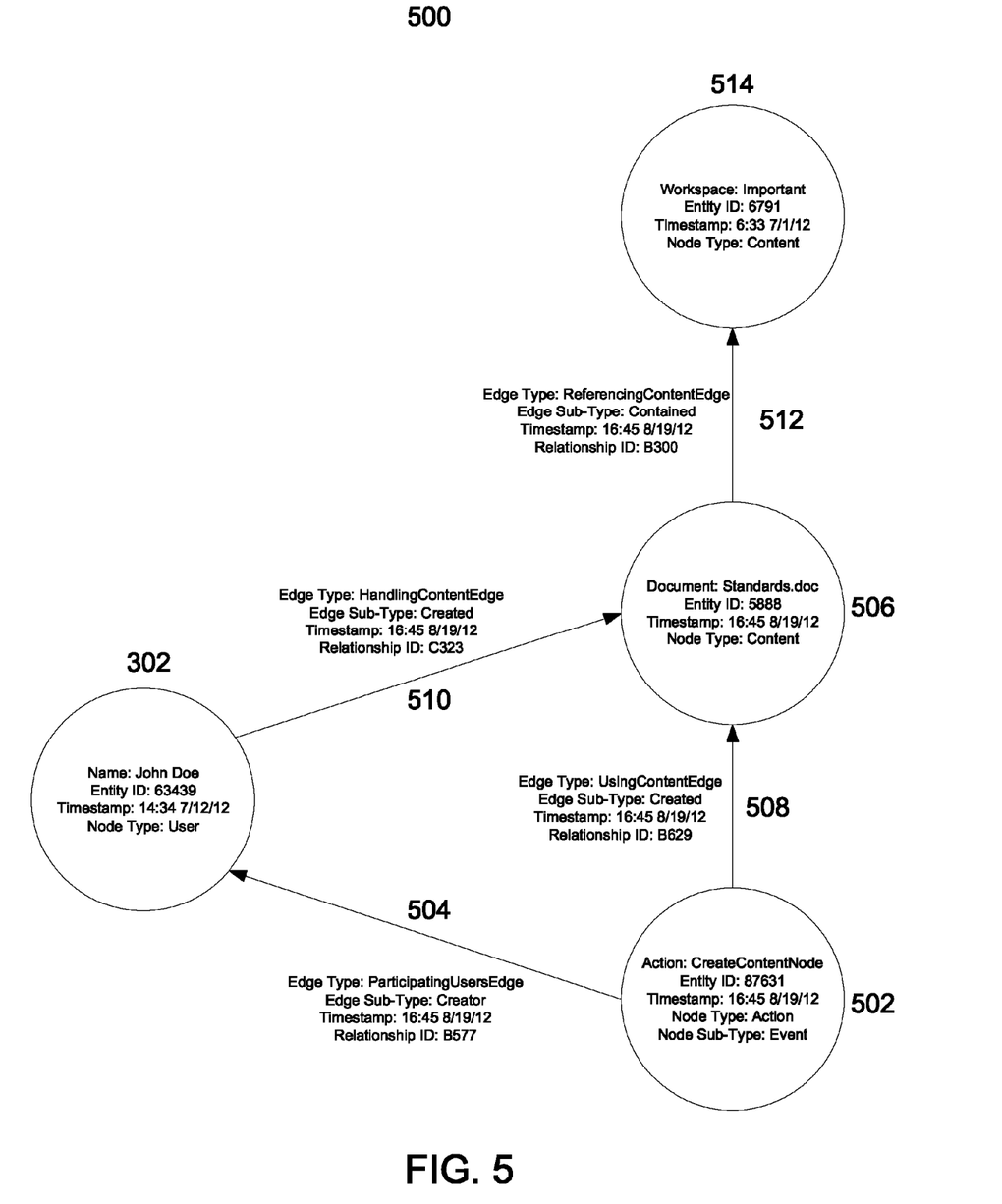
FIG. 5 illustrates an exemplary activity graph representing the creation of a document.

FIG. 5 illustrates an exemplary activity graph representing the creation of a document. Node 302 is a user node of an existing user with the name John Doe. John Doe uploads a document named "Standards.doc" into a workspace title "Important." In response to John uploading the document, nodes 502 and 506 and edges 504, 508, 510, and 512 are added to the activity graph 500. For example, the detection of the upload may have occurred automatically, or a user may have manually entered the details of the document upload.

Node 502 is an action node for the event of uploading the document "Standards.doc." For node 502, the node type is "Action," the node sub-type is "Event," the node action is "CreateContentNode," the entity identifier is "87631," and the timestamp is "16:45 8/19/12," as illustrated in FIG. 5. Thus, node 502 represents the event of uploading the document "Standards.doc."

Edge 504 is a unidirectional edge with an edge type of "ParticipatingUsersEdge," and edge sub-type of "Creator." The edge may indicate that John Doe was a participant in the event represented by node 502. More specifically, edge 504 may indicate that the user associated with node 302 was the creator for the event represented by node 502. The timestamp for edge 504 is "16:45 8/19/12," and may indicate that the association between node 302 and 502 occurred at this day and time. The relationship ID for edge 504 is "B577" and may represent an actual relationship between the event of node 502 and the user of node 302.

Node 506 is a content node representing the uploaded document named "Standards.doc." For node 506, the node type is "Content," the node sub-type is "Word Processing," the entity identifier is "5888," and the timestamp is "16:45 8/19/12," as illustrated in FIG. 5. For example, the entity identifier may be automatically assigned by the computer system when the node is created, or the entity identifier may be based on a document identification associated with a document repository. One of ordinary skill in the art will appreciate that there are numerous variations on determining or assigning an entity identifier for content, such as a document.

Edge 508 is a unidirectional edge with an edge type of "UsingContentEdge," and edge sub-type of "Created." The edge may indicate that the action represented by node 502 uses the content represented by node 506. More specifically, edge 508 may indicate that the event represented by node 502 created the content represented by node 506. The timestamp for edge 508 is "16:45 8/19/12," and may indicate that the association between node 502 and 506 occurred at this day and time. The relationship ID for edge 508 is "B629" and may represent an actual relationship between the event of node 502 and the content of node 506.

Edge 510 is a unidirectional edge with an edge type of "HandlingContentEdge," and edge sub-type of "Created." The edge may indicate that the user represented by node 302, John Doe, handles the content represented by node 506. More specifically, edge 510 may indicate that the user represented by node 302 is the creator of the content represented by node 506. The timestamp for edge 510 is "16:45 8/19/12," and may indicate that John Doe uploaded the Standards.doc document at this day and time. The relationship ID for edge 510 is "C323" and may represent an actual relationship between the user of node 302 and the content of node 506.

Node 514 is a content node representing a workspace named "Important." For node 514, the node type is "Content," the entity identifier is "6791," and the timestamp is "6:33 7/1/12," as illustrated in FIG. 5. The timestamp may indicate the day and time on which the workspace was created. The workspace may be a label, an electronic storage folder or directory, or any other type of workspace. In this example, the workspace represented by node 514 (and node 514 itself) existed prior to the upload of the Standards.doc document file by John Doe. Thus, the system did not need to create a new content node representing the workspace for the association. Instead, edge 512 is added to indicate the relationship between the content represented by node 506 and the workspace represented by node 514.

Edge 512 is a unidirectional edge with an edge type of "ReferencingContentEdge," and edge sub-type of "Contained." The edge may indicate that the Standards.doc document represented by node 506 is referenced by the Important workspace represented by node 514. More specifically, edge 512 may indicate that the document represented by node 506 is contained within the workspace represented by node 514. Thus, the system may determine based on this relationship that the Standards.doc document was added to an existing workspace named "Important." The timestamp for edge 512 is "16:45 8/19/12," and may indicate that the association between node 306 and 514 occurred at this day and time. The relationship ID for edge 512 is "B300" and may represent an actual relationship between the content of node 506 and the content of node 514.

Figure 6:
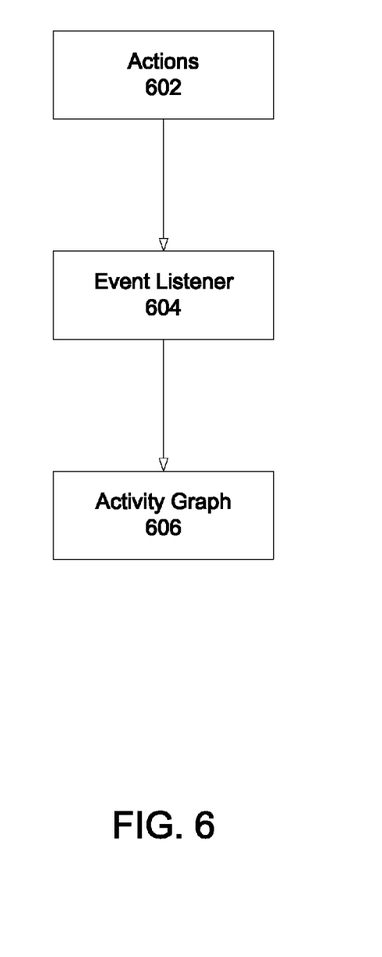
FIG. 6 illustrates an exemplary event listener.

FIG. 6 illustrates an exemplary event listener. Event listener 604 listens for actions 602. Actions 602 may include events and tasks. For example, an event may include a specific deed or action performed by an individual, a computing system, or any other entity. An event may also include an occurrence, which may be associated with a particular time or duration. For example, a task may include a deed or action to be performed by an individual, a computing system, or any other entity. More specifically, a task may be a specific piece of work that may be assigned to an individual, a computing system, or any other entity for performance. In one example, event listener 604 may detect the upload of a file to a computer system and detect a modification or deletion of the file in the computer system. In another example, event listener 604 may detect the association of content with other content, such as the association of word processing documents with other word processing documents. In another example, event listener 604 may detect the addition of a new user account or profile into a computer system. In yet another example, event listener 604 may detect the deletion of a user account or profile.

An activity event, named ActivityEvent, may be generated when the listener detects an action. The ActivityEvent may include all, or part, of the following information: 1) the operation type, for example, create, update, remove, or clone, 2) the target entity as defined in a data model, 3) the relationship used, 4) a list of changes, which may be a mapping of attribute name and value pairs, and 5) an event information, which may include an event identifier, the date and time of the event, and the event's initiating user. The ActivityEvents publishing is based on a publisher-subscriber model. In the publisher-subscriber model, a component may subscribe by implementing an ActivityListener interface. For each activity or event that is generated, each component that has implemented the ActivityListener interface may be called.

In response to the detection of action 602, the computer system may add, remove, update, or otherwise access activity graph 606. For example, the computer system may add user nodes, content nodes, action nodes, and edges in order to capture the action and related contents and users.

Using the activity graph, a computer system may retrieve information about the state of activities and the associated users and contents. For example, the system may analyze the activity graph to determine the contents that a particular user has accessed. In another example, the system may analyze the activity graph to determine a user's participation in a particular event or the user's participation as it relates to a particular content.

Queries that retrieve information from the activity graph may also be time-constrained. The structure of the activity graph enables efficiently limiting the results of the query based on the time-constrained requirements. In particular, each node and edge of the activity graph may include a timestamp indicating the day and time associated with the node or edge. For a time-constrained query, the system may traverse the graph starting from a particular node or edge until it reaches a timestamp outside of the time constraint. For example, a query requesting the retrieval of all addresses that a particular user has used in the past two years may be determined by traversing the relating user edges associated with user nodes of the individual until the timestamp of an edge or node indicates a time outside of the two-year constraint.

Time constrained queries may be performed by traversing the activity graph starting with a node that is current or up-to-date. The edges of the node may then be followed in order to access an older state, or related state of the node. For example, a list of current friends of a user may be determined by accessing edges or associated nodes of the user node indicating friend relationships of the user node. In another example, the past friends of a user may be determined by accessing edges or associated nodes of the user node that indicate a termination of a friend relationship during a particular time period.

Figure 7:
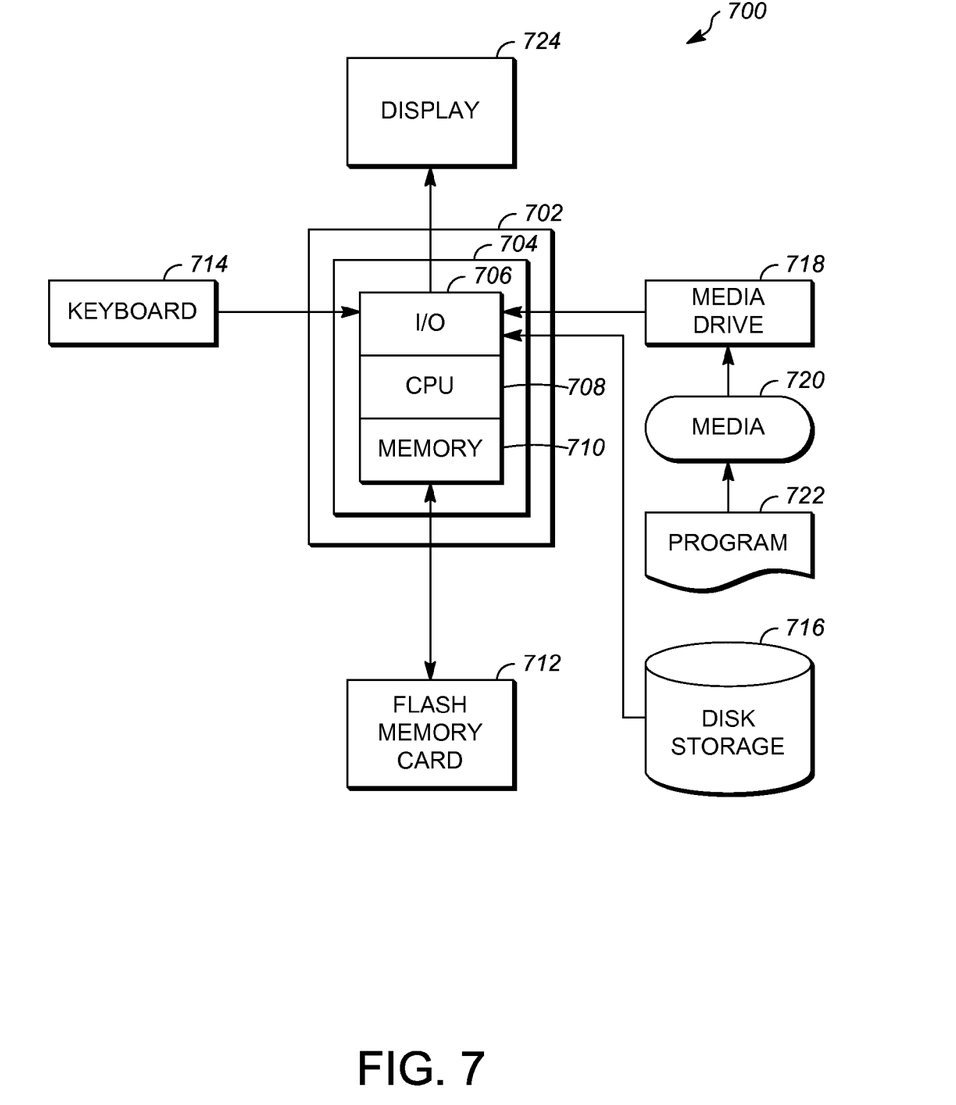
FIG. 7 depicts an exemplary computing system 700 configured to perform any one of the above-described processes.

FIG. 7 depicts an exemplary computing system 700 configured to perform any one of the above-described processes. In this context, computing system 700 may include, for example, a processor, memory, storage, and input/output devices (e.g., monitor, keyboard, disk drive, Internet connection, etc.). However, computing system 700 may include circuitry or other specialized hardware for carrying out some or all aspects of the processes. In some operational settings, computing system 700 may be configured as a system that includes one or more units, each of which is configured to carry out some aspects of the processes either in software, hardware, or some combination thereof.

FIG. 7 depicts computing system 700 with a number of components that may be used to perform the above-described processes. The main system 702 includes a motherboard 704 having an input/output ("I/O") section 706, one or more central processing units ("CPU") 708, and a memory section 710, which may have a flash memory card 712 related to it. The I/O section 706 is connected to a display 724, a keyboard 714, a disk storage unit 716, and a media drive unit 718. The media drive unit 718 can read/write a computer-readable medium 720, which can contain programs 722 and/or data.

At least some values based on the results of the above-described processes can be saved for subsequent use. Additionally, a non-transitory computer-readable medium can be used to store (e.g., tangibly embody) one or more computer programs for performing any one of the above-described processes by means of a computer. The computer program may be written, for example, in a general-purpose programming language (e.g., Pascal, C, C++, Java) or some specialized application-specific language.

Although only certain exemplary embodiments have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A computer-implemented method for storing correlated data in a graph database, the method comprising:
    storing, in the graph database, a first user node;
    associating the first user node with a first user profile and a first identifier, the first user profile associated with a first user, and the first user profile comprising information about the first user;
    in response to detecting a first request for creating a profile associated with a second user, the first request initiated by the first user:
        storing, in the graph database, a first event node and a second user node;
        associating the first event node with the first user node through a first edge, the first edge indicating the first user node is a participant of the first event node;
        associating the first event node with the second user node through a second edge, the second edge indicating the second user node is a participant of the first event node; and
        associating the first user node with the second user node through a third edge, the third edge relating the first user node and the second user node;
    in response to detecting an access of a content by the first user:
        storing, in the graph database, a second event node and a first content node, the first content node associated with the content;
        associating the second event node with the first user node through a fourth edge, the fourth edge indicating the first user node is a participant of the second event node;
        associating the second event node with the first content node through a fifth edge, the fifth edge indicating the second event node uses the first content node; and
        associating the first user node with the first content node through a sixth edge, the sixth edge indicating the first user node handles the first content node.

2. The computer-implemented method of claim 1, further comprising:
    in response to detecting a change in the information about the first user:
        storing, in the graph database, a third event node and a third user node;
        associating the third user node with the first identifier;
        associating the third event node with the third user node through a seventh edge, the seventh edge indicating the third user node is a participant of the third event node; and
        associating the third user node with the first user node through an eighth edge, the eighth edge relating the third user node and the first user node.

3. The computer-implemented method of claim 2, further comprising:
    in response to detecting a change in the content, the change caused by a fourth user:
        storing, in the graph database, a fourth event node and a second content node;
        associating the fourth event node with a fourth user node through a ninth edge, the ninth edge indicating the fourth user node is a participant of the fourth event node;
        associating the fourth event node with the second content node through a tenth edge, the tenth edge indicating the fourth event node uses the second content node; and
        associating the second content node with the first content node through an eleventh edge, the eleventh edge indicating the second content node references the first content node.

4. The computer-implemented method of claim 1, wherein:
    further in response to detecting an access of the content by the first user:
        storing, in the graph database, a second content node, the second content node associated with a workspace; and associating the first content node with the second content node through a seventh edge indicating the second content contains the first content.

5. The computer-implemented method of claim 1, wherein:
the sixth edge further indicates the association between the first user node and the first content node, the association selected from the group comprising owner, reviewer, and modifier.

6. The computer-implemented method of claim 1, wherein:
detecting the access of the content by the first user comprises detecting an upload of the content by the first user.

7. The computer-implemented method of claim 1, wherein:
the first event node is associated with a first time information, the first time information based on the time of the first request; and
the second event node is associated with a second time information, the second time information based on the time of the access of the content.

8. The computer-implemented method of claim 2, wherein:
the third event node is associated with a third time information, the third time information based on the time the change in the information about the first user was detected.

9. The computer-implemented method of claim 3, wherein:
the fourth event node is associated with a fourth time information, the fourth time information based on the time the change in the content was detected.

10. A non-transitory computer-readable storage medium comprising computer-executable instructions for storing correlated data in a graph database, the instructions comprising:
storing, in the graph database, a first user node;
associating the first user node with a first user profile and a first identifier, the first user profile associated with a first user, and the first user profile comprising information about the first user;
in response to detecting a first request for creating a profile associated with a second user, the first request initiated by the first user:
storing, in the graph database, a first event node and a second user node;
associating the first event node with the first user node through a first edge, the first edge indicating the first user node is a participant of the first event node;
associating the first event node with the second user node through a second edge, the second edge indicating the second user node is a participant of the first event node; and
associating the first user node with the second user node through a third edge, the third edge relating the first user node and the second user node;
in response to detecting an access of a content by the first user:
storing, in the graph database, a second event node and a first content node, the first content node associated with the content;
associating the second event node with the first user node through a fourth edge, the fourth edge indicating the first user node is a participant of the second event node;
associating the second event node with the first content node through a fifth edge, the fifth edge indicating the second event node uses the first content node; and
associating the first user node with the first content node through a sixth edge, the sixth edge indicating the first user node handles the first content node.

11. The non-transitory computer-readable storage medium of claim 10, further comprising:
in response to detecting a change in the information about the first user:
storing, in the graph database, a third event node and a third user node;
associating the third user node with the first identifier;
associating the third event node with the third user node through a seventh edge, the seventh edge indicating the third user node is a participant of the third event node; and
associating the third user node with the first user node through an eighth edge, the eighth edge relating the third user node and the first user node.

12. The non-transitory computer-readable storage medium of claim 11, further comprising:
in response to detecting a change in the content, the change caused by a fourth user:
storing, in the graph database, a fourth event node and a second content node;
associating the fourth event node with a fourth user node through a ninth edge, the ninth edge indicating the fourth user node is a participant of the fourth event node;
associating the fourth event node with the second content node through a tenth edge, the tenth edge indicating the fourth event node uses the second content node; and
associating the second content node with the first content node through an eleventh edge, the eleventh edge indicating the second content node references the first content node.

13. The non-transitory computer-readable storage medium of claim 10, wherein:
further in response to detecting an access of the content by the first user:
storing, in the graph database, a second content node, the second content node associated with a workspace; and
associating the first content node with the second content node through a seventh edge indicating the second content contains the first content.

14. The non-transitory computer-readable storage medium of claim 10, wherein:
the sixth edge further indicates the association between the first user node and the first content node, the association selected from the group comprising owner, reviewer, and modifier.

15. The non-transitory computer-readable storage medium of claim 10, wherein:
detecting the access of the content by the first user comprises detecting an upload of the content by the first user.

16. The non-transitory computer-readable storage medium of claim 10, wherein:
the first event node is associated with a first time information, the first time information based on the time of the first request; and
the second event node is associated with a second time information, the second time information based on the time of the access of the content.

17. The non-transitory computer-readable storage medium of claim 11, wherein:
the third event node is associated with a third time information, the third time information based on the time the change in the information about the first user was detected.

18. The non-transitory computer-readable storage medium of claim 12, wherein:

the fourth event node is associated with a fourth time information, the fourth time information based on the time the change in the content was detected.

19. An apparatus for storing correlated data in a graph database, the apparatus comprising:
a memory configured to store data; and
a computer processor configured to:
store, in the graph database, a first user node;
associate the first user node with a first user profile and a first identifier, the first user profile associated with a first user, and the first user profile comprising information about the first user;
in response to detecting a first request for creating a profile associated with a second user, the first request initiated by the first user:
store, in the graph database, a first event node and a second user node;
associate the first event node with the first user node through a first edge, the first edge indicating the first user node is a participant of the first event node;
associate the first event node with the second user node through a second edge, the second edge indicating the second user node is a participant of the first event node; and
associate the first user node with the second user node through a third edge, the third edge relating the first user node and the second user node;
in response to detecting an access of a content by the first user:
store, in the graph database, a second event node and a first content node, the first content node associated with the content;
associate the second event node with the first user node through a fourth edge, the fourth edge indicating the first user node is a participant of the second event node;
associate the second event node with the first content node through a fifth edge, the fifth edge indicating the second event node uses the first content node; and
associate the first user node with the first content node through a sixth edge, the sixth edge indicating the first user node handles the first content node.

20. The apparatus of claim 19, further comprising:
in response to detecting a change in the information about the first user:
store, in the graph database, a third event node and a third user node;
associate the third user node with the first identifier;
associate the third event node with the third user node through a seventh edge, the seventh edge indicating the third user node is a participant of the third event node; and
associate the third user node with the first user node through an eighth edge, the eighth edge relating the third user node and the first user node.

21. The apparatus of claim 20, further comprising:
in response to detecting a change in the content, the change caused by a fourth user:
store, in the graph database, a fourth event node and a second content node;
associate the fourth event node with a fourth user node through a ninth edge, the ninth edge indicating the fourth user node is a participant of the fourth event node;
associate the fourth event node with the second content node through a tenth edge, the tenth edge indicating the fourth event node uses the second content node; and
associate the second content node with the first content node through an eleventh edge, the eleventh edge indicating the second content node references the first content node.

22. The apparatus of claim 19, wherein:
further in response to detecting an access of the content by the first user:
store, in the graph database, a second content node, the second content node associated with a workspace; and
associate the first content node with the second content node through a seventh edge indicating the second content contains the first content.

23. The apparatus of claim 19, wherein:
the sixth edge further indicates the association between the first user node and the first content node, the association selected from the group comprising owner, reviewer, and modifier.

24. The apparatus of claim 19, wherein:
detecting the access of the content by the first user comprises detecting an upload of the content by the first user.

25. The apparatus of claim 19, wherein:
the first event node is associated with a first time information, the first time information based on the time of the first request; and
the second event node is associated with a second time information, the second time information based on the time of the access of the content.

26. The apparatus of claim 20, wherein:
the third event node is associated with a third time information, the third time information based on the time the change in the information about the first user was detected.

27. The apparatus of claim 21, wherein:
the fourth event node is associated with a fourth time information, the fourth time information based on the time the change in the content was detected.

* * * * *